Nov. 14, 1950 C. E. ATKINS 2,530,140

SECRET SIGNALING SYSTEM

Filed Aug. 11, 1944 7 Sheets-Sheet 1

INVENTOR
CARL EDWARD ATKINS
BY
Bartlett, Eyre, Keel & Weymouth
ATTORNEYS

SECRET SIGNALING SYSTEM

Filed Aug. 11, 1944 7 Sheets-Sheet 2

INVENTOR
CARL EDWARD ATKINS
BY
Bartlett, Eyre, Keel & Weymouth
ATTORNEYS

Nov. 14, 1950 C. E. ATKINS 2,530,140

SECRET SIGNALING SYSTEM

Filed Aug. 11, 1944 7 Sheets-Sheet 3

INVENTOR
CARL EDWARD ATKINS
BY
Bartlett, Eyre, Keel & Crazyman(?)
ATTORNEYS

Nov. 14, 1950 C. E. ATKINS 2,530,140

SECRET SIGNALING SYSTEM

Filed Aug. 11, 1944 7 Sheets-Sheet 4

INVENTOR
CARL EDWARD ATKINS
BY
Bartlett, Eyre, Keel & Weymouth
ATTORNEYS

Nov. 14, 1950 C. E. ATKINS 2,530,140

SECRET SIGNALING SYSTEM

Filed Aug. 11, 1944 7 Sheets-Sheet 5

INVENTOR
CARL EDWARD ATKINS
BY
Bartlett, Eyre, Keel & Weymouth
ATTORNEYS

Nov. 14, 1950 C. E. ATKINS 2,530,140

SECRET SIGNALING SYSTEM

Filed Aug. 11, 1944 7 Sheets-Sheet 6

INVENTOR
CARL EDWARD ATKINS
BY
Bartlett, Eyre, Keel & Weymouth
ATTORNEYS

Nov. 14, 1950 C. E. ATKINS 2,530,140

SECRET SIGNALING SYSTEM

Filed Aug. 11, 1944 7 Sheets-Sheet 7

INVENTOR
CARL EDWARD ATKINS
BY
Bartlett, Eyre, Keel & Weymouth
ATTORNEYS

Patented Nov. 14, 1950

2,530,140

UNITED STATES PATENT OFFICE 2,530,140

SECRET SIGNALING SYSTEM

Carl Edward Atkins, Elgin, Ill., assignor to Tung-Sol Lamp Works, Inc., Newark, N. J., a corporation of Delaware Application August 11, 1944, Serial No. 549,015

11 Claims. (Cl. 250—6)

My present invention relates to secret signaling. More particularly, my invention comprises a system whereby intelligence may be scrambled at one station and transmitted from that station for reception and decoding at a plurality of other stations without danger of detection by unauthorized interceptors of the transmitted scrambled intelligence. Briefly and in general, the system of the present invention comprises the like treatment at each station of capriciously varying energy available at each station and the subsequent utilization of such treated energy for scrambling at the transmitting station the signal to be transmitted and for unscrambling, at the other stations, the received energy. The like treatment of the varying energy at each station may be effected in various ways. For example, a delayed replica of the signal intelligence could be used to scramble the varying energy or a mechanically operated commutator device could be used to scramble the varying energy. Thus, in general, secrecy is achieved in the system by a like treatment, known only to the station concerned, of energy which may or may not be known to an eavesdropper, and the scrambling of the transmitted signal with such treated energy.

For a better understanding of the invention, reference may be had to the accompanying drawings, of which—

The term "scrambling" as used herein relates to the mixing or compounding of an intelligible signal with other signals to form an unintelligible result for purposes of transmission to another station.

Figure 1:
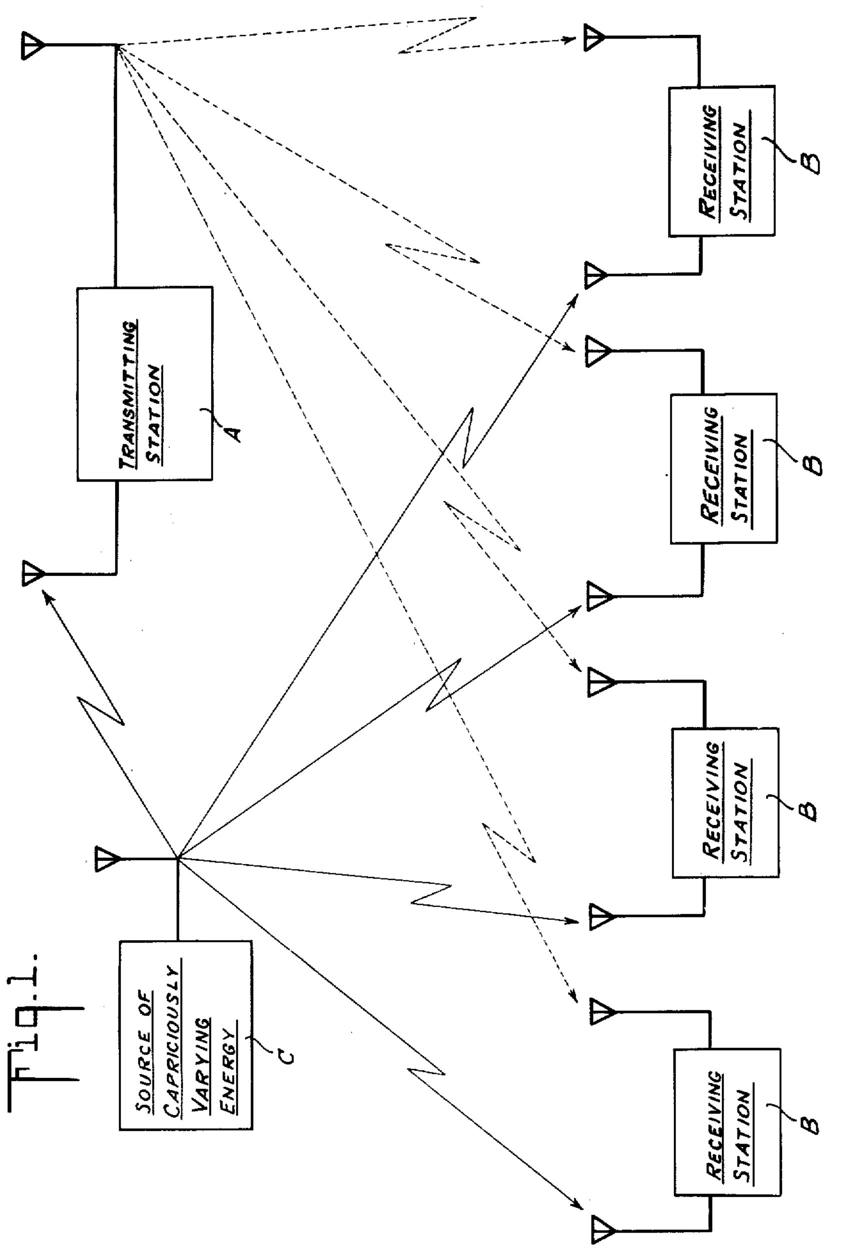
Fig. 1 is a diagram explanatory of the invention.

The underlying theory of the system of the invention will best be understood by reference to Fig. 1 which represents diagrammatically the secret transmission of intelligence from a single transmitting station A to each of a plurality of receiving stations B. At station A and at each of stations B there is available capriciously varying energy which may, for example, be that radiated from a separate station C. At station A and also at each of the stations B are like means for treating the energy received from C. Such means may be formal scrambling devices known to the art or other scrambling means hereinafter described may be employed. At station A the capriciously varying energy from source C is first treated by the scrambling means at that station and then the signal to be transmitted is scrambled with the so treated capriciously varying energy and radiated to the receiving stations. At each station B the capriciously varying energy from station C is received and likewise the radiated mixture, including the signal, is received from station A. As each station B includes a scrambling means identical to that at station A, the capriciously varying energy can be similarly treated and the signal mixture decoded by using the treated capriciously varying energy for unscrambling the signal mixture. Thus although an eavesdropper might pick up the energy radiated from C and also that from station A, he would not be able to decipher the signal. This is so because in order to get a clue to the deciphering or decoding of a message, an eavesdropper depends upon getting an intelligible result. The energy radiated from source C contains no signal as it is merely capriciously varying energy. The mixture radiated from station A includes components corresponding to the energy radiated from C, components introduced by the scrambling device and the actual signal intelligence. If the energies from source C and station A were compared by the eavesdropper, the result, being the signal scrambled by the scrambling device at station A, is not intelligible. However, at the various stations B, the signal can be detected because of the inclusion in the station equipment of scrambling means identical with that at station A.

In Fig. 1 the source C of capriciously varying energy has been indicated as being a separate station transmitting energy to station A and to all stations B. Obviously this source could as well be located at station A or at any station B. In the various embodiments of the invention illustrated in Figs. 2 to 7 the source of the capriciously varying energy is located at the station at which the signal is introduced, that is, station A.

Figure 2:
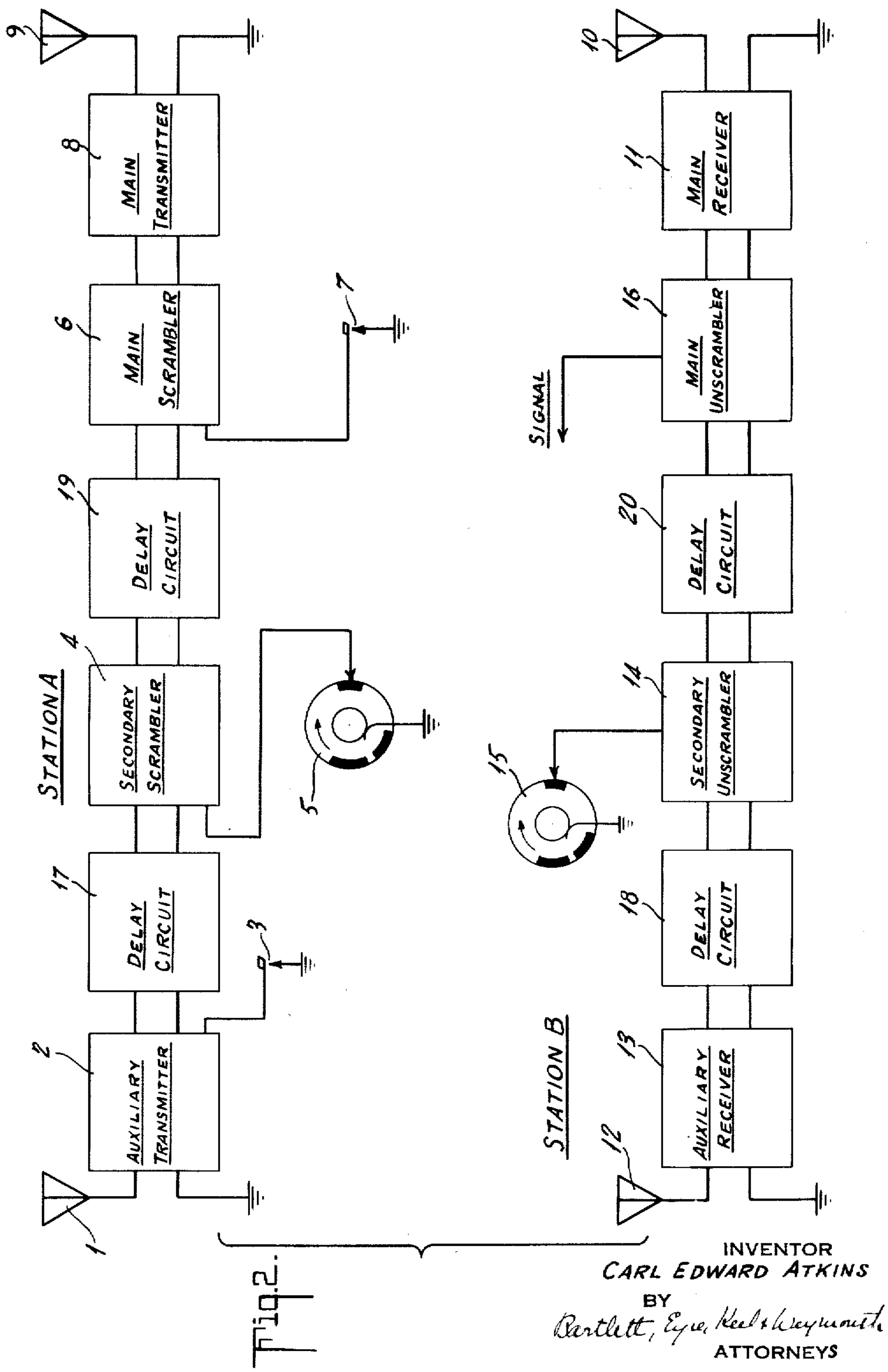
Fig. 2 is a block diagram illustrating diagrammatically equipment at a transmitting station and at a receiving station corresponding to one embodiment of the invention.

In the embodiment of the invention diagrammatically illustrated in the simple block diagram of Fig. 2, the equipment at the transmitting station, station A, includes a transmitting antenna 1 for transmission of energy from a transmitter 2, a key 3 for capriciously varying the energy delivered by transmitter 2, a unit 4, labeled "secondary scrambler" to which the capriciously varying energy from unit 2 is also delivered and in which such energy is scrambled as by a commutator mechanism 5, a "main scrambler" 6 in which the signal intelligence controlled by a key 7 is scrambled with the energy delivered by unit 4, and a main transmitter 8 for delivery of the signal mixture to transmitting antenna 9. Each receiving station B is equipped with a receiving antenna 10 and main receiver 11 for reception of the signal mixture from antenna 9 of station A, with an antenna 12 and auxiliary receiver 13 for reception of the energy transmitted by antenna 1 of station A, with a unit 14 for unscrambling the energy delivered thereto from the auxiliary receiver 13 by a commutator device 15 corresponding to the device 5 of station A, and with a main unscrambling unit 16 to which energy from unit 14 and from the main signal receiver 11 is delivered and which delivers energy corresponding to the signal introduced by the key 7 at station A. In the operation of the system of Fig. 2, key 3 is operated continuously in any capricious manner, either manually or mechanically. Energy from unit 2, varied by the operation of the key 3, is transmitted to station B by transmitting antenna 1. This same capriciously varying energy is similarly applied to unit 4 where it is scrambled as a result of the operation of commutator 5. The energy delivered by unit 4 is then used to scramble in main scrambler 6 the signal intelligence introduced by the key 7, which scrambled signal is then transmitted from station A to all stations B. In the simple block diagram of Fig. 2 the commutator devices 5 and 15 have been illustrated as comprising rotating conducting wheels having but three insulating segments thereon. Obviously, in practice many more insulating segments would be provided if a commutator disk were used for scrambling the signal. Transmitters 2 and 8 will of course transmit at substantially different frequencies to which the receivers 13 and 11 will be appropriately tuned. As it is necessary, in order to insure like treatment at each station of the capriciously varying energy, the equipment at each station includes suitable time delay circuits 17 and 18 to compensate for the time taken for the energy to travel through the intervening space from station A to each station B. The delay in circuit 17 will exceed that in circuit 18 by an amount corresponding to the transit time. Similarly, delay circuits 19 and 20 are provided at the respective stations A and B to insure like treatment in the units 6 and 16. The time delay in circuit 20 of station B must exceed that in unit 19 at station A by an amount corresponding to the transit time.

Figure 3:
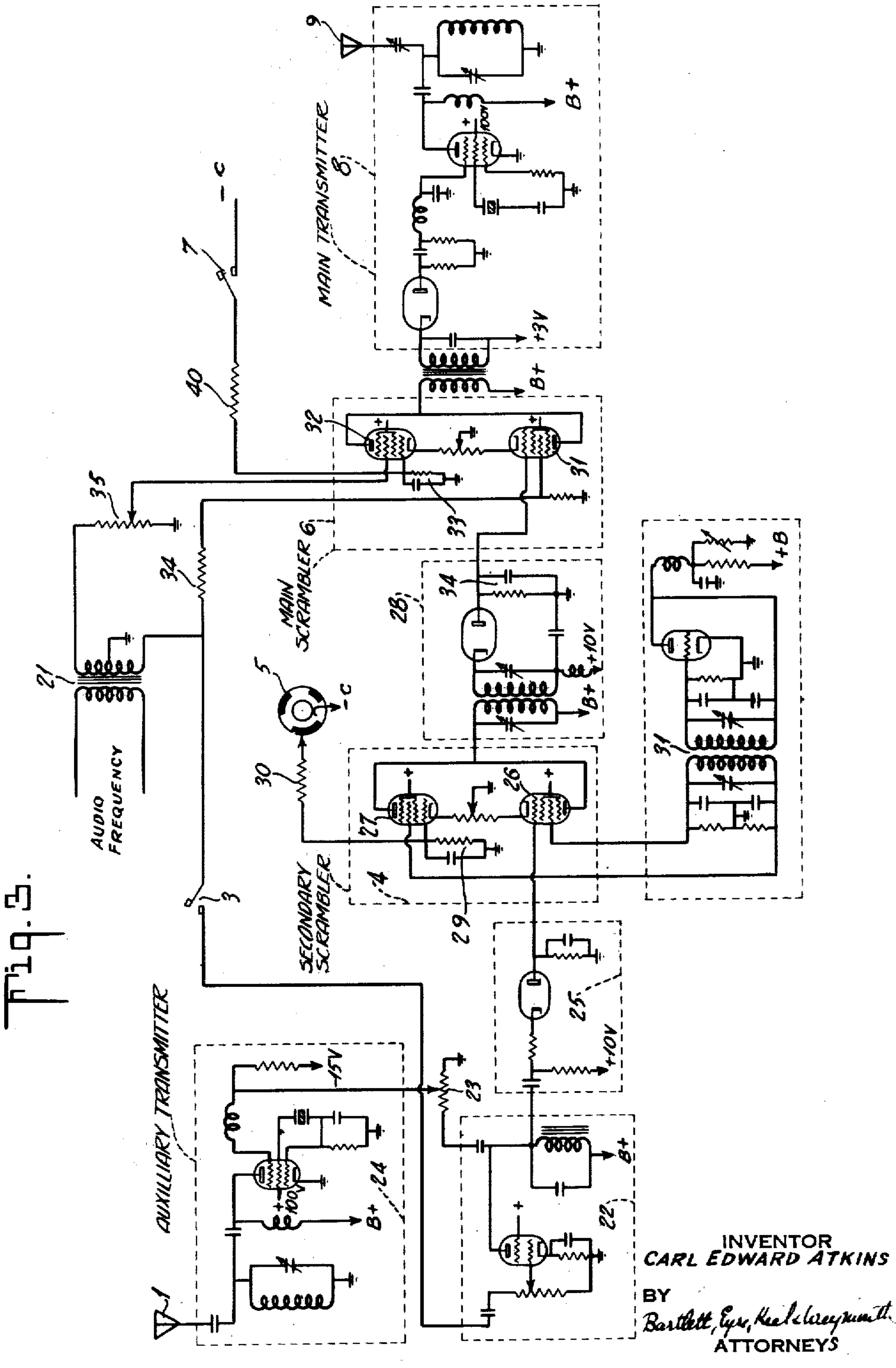
Figs. 3 and 4 illustrate specific circuits suitable for use at the transmitting and receiving stations respectively of the system of Fig. 2.
Figure 4:
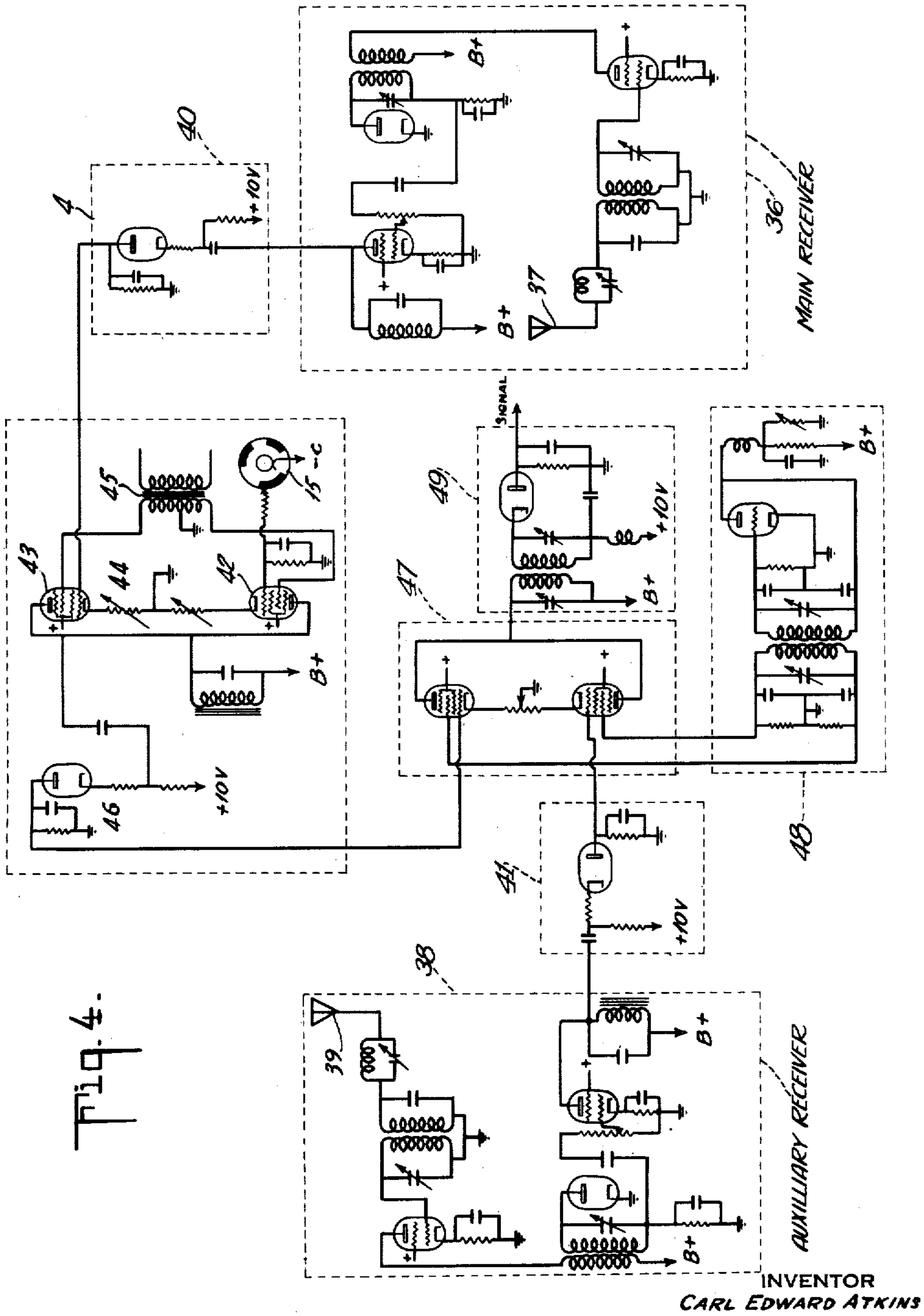

In Fig. 3 is shown specific equipment which might be employed in the system of Fig. 2 at station A and in Fig. 4 is shown specific equipment which might be employed in the system of Fig. 2 at station B. In Fig. 3 audio frequency energy is supplied from any suitable source (not shown) to the primary of a transformer 21, the secondary of which is grounded at its center and connected at one end through the key 3 to the input of an audio frequency amplifier 22. A resistor 23 is grounded at one end and connected at its other end through a blocking condenser to the output circuit of the amplifier 22. A tap on resistor 23 is connected to the input circuit of the transmitter 24 which feeds the antenna 1. Amplifier 22 and transmitter 24 thus correspond with unit 2 of Fig. 2. The output circuit of amplifier 22 is also connected to a rectifier circuit 25 including a diode the cathode of which is connected to amplifier 22 through a series connected condenser and resistor. Low positive voltage of say 10 volts is supplied to the input circuit of the rectifier 25 through a shunt resistor. The output network of rectifier 25, comprising a parallel connected resistor and condenser, is connected to the inner control grid of a multi-element tube 26. The circuit 25, in addition to its rectifying properties also provides the necessary time delay hereinbefore described in connection with unit 17 of Fig. 2. Tube 26 and a tube 27, together with the various connections now to be described, form an electronic switch or "gate" operating as the "secondary scrambler" of Fig. 2 as indicated by the reference numeral 4 applied to the associated elements. The cathodes of tubes 26 and 27 are connected together through a resistor having an adjustable center tap to ground, and the anodes of the plates are connected in parallel to the input circuit of a rectifier unit 28. The inner control grid of tube 27 is connected to ground through a network 29 simulating the characteristics of the output network of rectifier 25. It is also connected through a resistor 30 with the sliding contact of the commutator device 5, the other contact of which is connected to a source of negative voltage, indicated by $-c$ on the drawing. The outer grids of tubes 26 and 27 are supplied with radio frequency energy from any suitable source, as for example the circuit indicated at 31. The above described "gate" 4 operates to pass energy to the rectifier 28 only when negative voltage is applied to one or the other of the inner control grids of tubes 26 and 27. When the inner control grids of both tubes are at ground potential, that is, when rectifier 25 is not passing current due to opening of key 3, and when the circuit through resistor 30 is opened by engagement of the sliding contact of commutator 5 with an insulating segment thereon, the tubes 26 and 27 are balanced and hence there will be no current in the output circuit of the "gate." When negative voltage is applied to the inner grid of one of the tubes, say to tube 27, by circuit closure through device 5, that tube becomes blocked, hence the "gate" is unbalanced and rectifier 28 will be energized. If negative voltage is applied to the inner grid of both tubes, both tubes are blocked and again the "gate" passes no energy. Thus the "gate" 4 comprising the tubes 26 and 27 operates as a scrambler, the energy passed thereby depending both upon the operation of key 3 and upon the operation of device 5. When energy is passed by the "gate" it is rectified by the rectifier circuit 28 and negative voltage is applied to the inner control grid of a multi-element tube 31 of the main scrambler or "gate" 6 of the station. The inner control grid of the other tube 32 of "gate" 6 is connected to ground through a network 33 simulating the characteristics of the output circuit 34 of rectifier 28 and is also connected through a resistor 40 and the signal key 7 to a source of negative voltage. In the specific embodiment of the invention illustrated in Fig. 3, the "gate" 6 is energized with audio frequency energy from the transformer 21, the secondary of which is connected across the outer control grids of the tubes 31 and 32. Suitable resistances 34 and 35 are included in the leads to the transformer secondary to prevent interference from the operation of key 3. As "gate" 6 operates similarly to "gate" 4 to pass energy only when one or the other of the tubes is blocked, further description thereof is unnecessary. The output from "gate" 6 is fed to any suitable type of transmitter 8 for modulation of its radiated energy. For purposes of illustration the transmitter 8 has been shown as an amplitude modulated transmitter, it being understood, however, that other suitable types of transmitters well known in the art may be used.

In Fig. 4 is shown equipment at a station such as station B of Fig. 2 for receiving and detecting the signal transmitted from a station equipped with the instrumentalities of Fig. 3. As shown, this equipment includes a receiver 36 and receiving antenna 37 tuned to the transmitting frequency of antenna 9 of station A, a receiver 38 and receiving antenna 39 tuned to the frequency transmitted by antenna 1 of station A, delay and rectifier circuits 40 and 41 connected respectively in the output circuits of receivers 36 and 38, a pair of tubes 42 and 43 connected to form a "gate" 44 energized by audio frequency energy from a transformer 45 and operated conjointly by commutator 15 and the output from rectifier 40, a rectifier 46 in the output circuit of "gate" 44, a "gate" 47 energized by radio frequency energy from a circuit 48 and controlled conjointly by the outputs from rectifiers 41 and 46, and a detector 49 in the output circuit of "gate" 47. In operation the energy received by main receiver 36 corresponding to that transmitted by antenna 9 is demodulated in rectifier 40 and pulses, corresponding to the pulses passed by "gate" 6 of Fig. 3, are applied to tube 43 of "gate" 44. Commutator 15, operated synchronously with commutator 5 of Fig. 3 by any suitable means (not shown) applies pulses to tube 42 corresponding to those introduced by operation of device 5. The output of "gate" 44, after rectification in rectifier 46, is applied to the inner control grid of one tube of "gate" 47 simultaneously to the application to the inner control grid of the other tube of "gate" 47 of the rectified output of receiver 38 corresponding to the capricious operation of key 3 at station A. The output from "gate" 47, after rectification in detector 49, yields the signal introduced at station A by the operation of key 7.

The particular arrangement of circuits and "gates" shown in Fig. 4 differs from the diagrammatic disclosure of station B of Fig. 2 in that the commutator device 15 operates to unscramble the energy received by the main receiver rather than that received by the auxiliary receiver. Actually, however, when the scrambling and unscrambling devices at the stations are electronic switches such as the "gates" of Figs. 3 and 4, the order in which the scrambling or unscrambling is effected is immaterial. For example, instead of unscrambling the rectified energy from either receiver at station B with the pulses controlled by commutator device 15, the rectified energy from both receivers could be applied to the same "gate." A second "gate" activated by the rectified output therefrom and by the commutator device would then yield the signal intelligence. Thus at the receiving station there are three varying energies, one corresponding to the capricious operation of key 3, one corresponding to operation of the commutator device, and one corresponding to the operation of both keys 3 and 7 and upon operation of the commutator device. Any two of these energies can be used to control a first "gate" and the output from such "gate" used conjointly with the third energy for control of a second "gate" which yields the signal.

Figure 5:
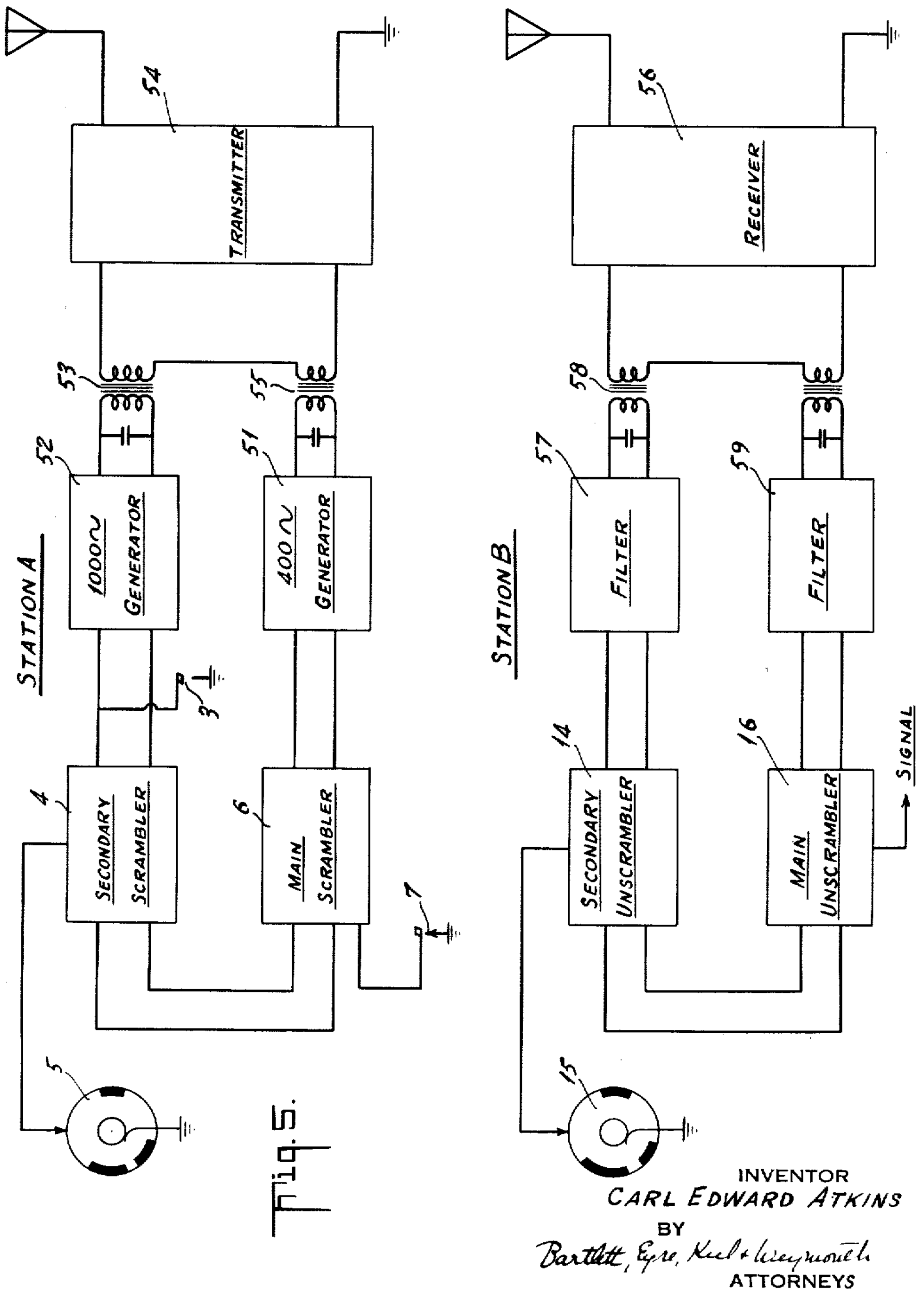
Figs. 5, 6 and 7 are block diagrams similar to Fig. 2 but illustrating other embodiments of the invention.

In Figs. 2 to 4, for simplicity of explanation two separate transmitters are indicated at station A and two separate receivers are indicated at station B. In practice, however, it would not be necessary to use more than one transmitter at station A and one receiver at station B. Two sets of signals could still be transmitted and received as a single radio frequency carrier could be used for both sets of signals. In Fig. 5 such an arrangement as applied to the system of Fig. 2 is indicated diagrammatically. At station A a generator 51 of say a 400 cycle tone, is connected to the output of main scrambler 6. The scramble pulses symbolized by key 3 control a generator 52 of say a 1000 cycle tone as well as the secondary scrambler 4. The energy from generator 52 corresponding to the capricious operation of key 3 is fed through a transformer 53 to the transmitter 54 and the signal mixture from generator 51 corresponding to the operation of keys 3 and 7 and of commutator device 5 is fed through a transformer 55 to the transmitter 54, the secondaries of transformers 53 and 55 being series connected. Both signals thus modulate the transmitter 54. At station B one receiver 56 demodulates both of these signals. The 1000 cycle signal is selected by a filter 57 coupled to receiver 56 by a transformer 58 and the 400 cycle signal is selected by a filter 59 similarly coupled to receiver 56. As in Fig. 2, the signal corresponding to the capricious operation of key 3 is unscrambled in unit 14 with energy controlled by device 15 and unscrambler 16, jointly activated by the output of unit 14 and by the main signal from filter 59, yields the signal intelligence introduced by operation of key 7.

Figure 6:
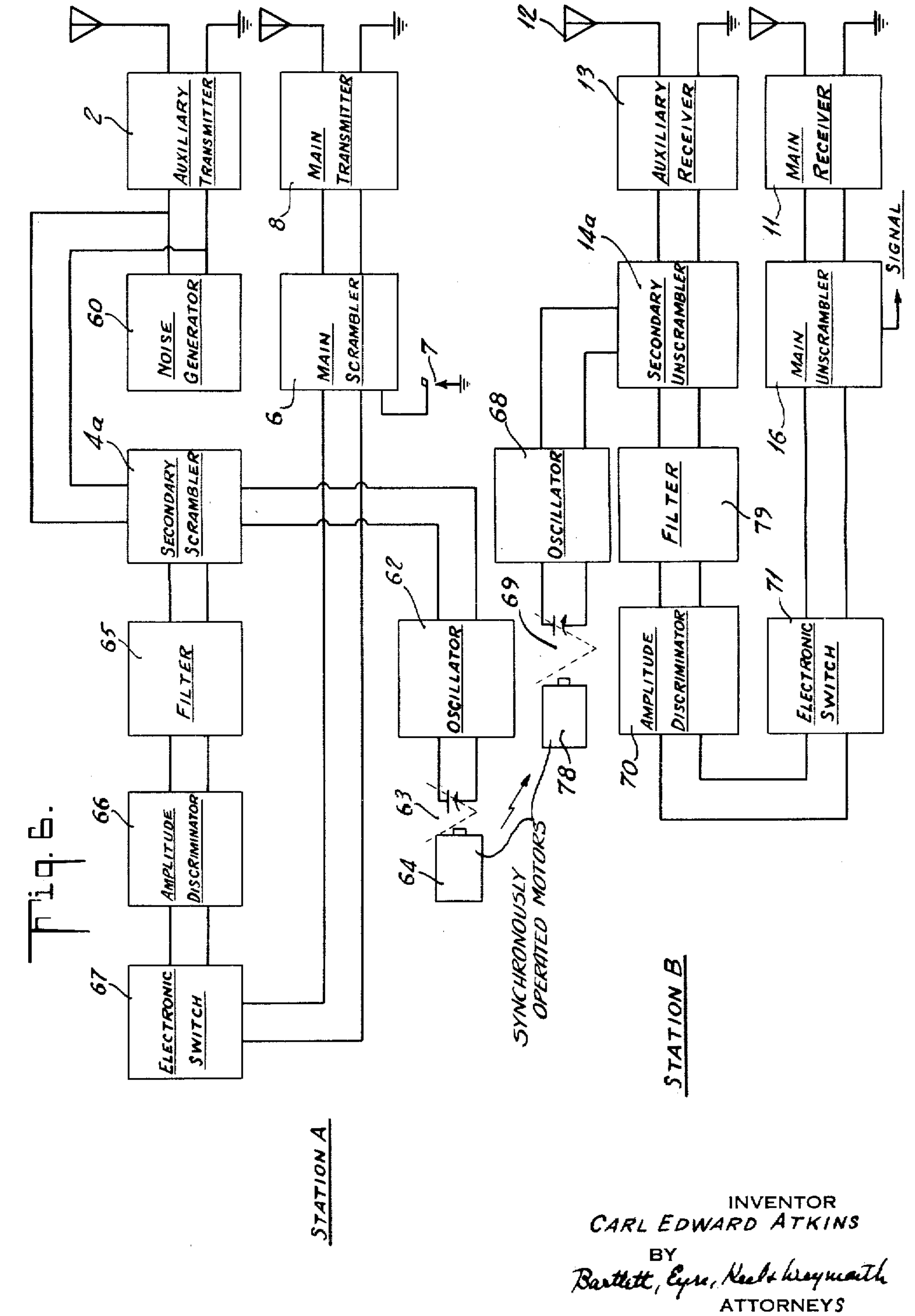

Fig. 6 illustrates diagrammatically another system embodying the invention and corresponding to a modification of the system of Fig. 2. In Fig. 6 random noise impulses produced by a noise generator 60 at station A, are used, after formal preparation, to scramble the intelligence transmitted from that station. As in Fig. 2, key 7 is the source of the signal intelligence to be transmitted and it actuates the main scrambler or gate 6, passing energy to the main transmitter 8. The output of noise generator 60 is radiated directly by auxiliary transmitter 2. In order that the noise may be used to scramble telegraph signals using "gates" as instrumentalities, it is necessary to select a certain specific portion of the noise spectrum and prepare it for application to scramber or "gate" 6. Accordingly, energy from noise generator 60 is fed to a scrambler 4*a*, corresponding in function to the "gate" 4 of Figs. 2 and 3, to which is also applied energy from a variable frequency oscillator 62, the frequency of which is shifted in a predetermined manner by electro-mechanical means 63 activated by a motor 64. Scrambler 4*a* is any suitable device known in the art for heterodyning the energy received from noise generator 60 with the energy delivered by oscillator 62. Oscillator 62, together with the motor 64 and mechanical means 63, correspond in function to the commutator device 5 of Figs. 2 and 3. The output of scrambler 4*a* is fed to a band pass filter 65 which serves to select those frequency components that are within its band at a given time. Energy passing through filter 65 is fed to an amplitude discriminator 66 which selects pulses having an amplitude in excess of a predetermined level, or sufficiently above the average level of the noise energy passing through filter 65. Discriminator 66 could be, for example, a voltage delayed diode circuit such as used as noise limiters in communication receivers. The output of discriminator 66 is fed to an electronic switch 67 which is triggered by the impulses selected by unit 66 on an on-and-off basis. That is, if one impulse turns the switch 67 on, the next impulse turns it off and the next succeeding impulse turns it on again. As electronic switches of this type are known in the art, further description thereof is deemed unnecessary. The control impulses from the electronic switch 67 are used to scramble the signal intelligence in "gate" 6.

At station B noise energy transmitted from transmitter 2 of station A is picked up by antenna 12, demodulated in auxiliary receiver 13 and delivered thereby to unscrambler 14*a* corresponding in function to unscrambler 14 of Fig. 2. In unscrambler 14*a* the demodulated noise energy is heterodyned with energy from a variable frequency oscillator 68, the frequency of which is varied synchronously with that of oscillator 62 by electro-mechanical means 69 driven by synchronous motor 78, motors 64 and 78 being synchronously operated by any suitable means and the variations of frequency of oscillator 68 taking place at a slightly later time than the corresponding variations of oscillator 62 in order to compensate for the distance between the stations.

The heterodyned energy delivered by unscrambler 14*a* is treated as is the output of scrambler 4*a* at station A in order to prepare it for application to unscrambler unit 16, that is, it is passed through band pass filter 79, amplitude discriminator 70 and electronic switch 71, corresponding respectively to units 65, 66 and 67 of station A. Unscrambling "gate" 16 activated by the pulses passed by electronic switch 71 and by the output from main receiver 11 yields the useful signal. From the above description of Fig. 6 it will be apparent that the system thereof differs in substance from that of Figs. 2 to 4 only in the substitution of the noise generator 60 for the capriciously operated key 3 and in the substitution of the mechanically varied synchronously operated frequency oscillators 62 and 68 for the commutator devices 5 and 15. Obviously, the system of Fig. 6, like that of Fig. 2, could be provided with but one transmitter at station A and but one receiver at station B as disclosed in Fig. 5.

Figure 7:
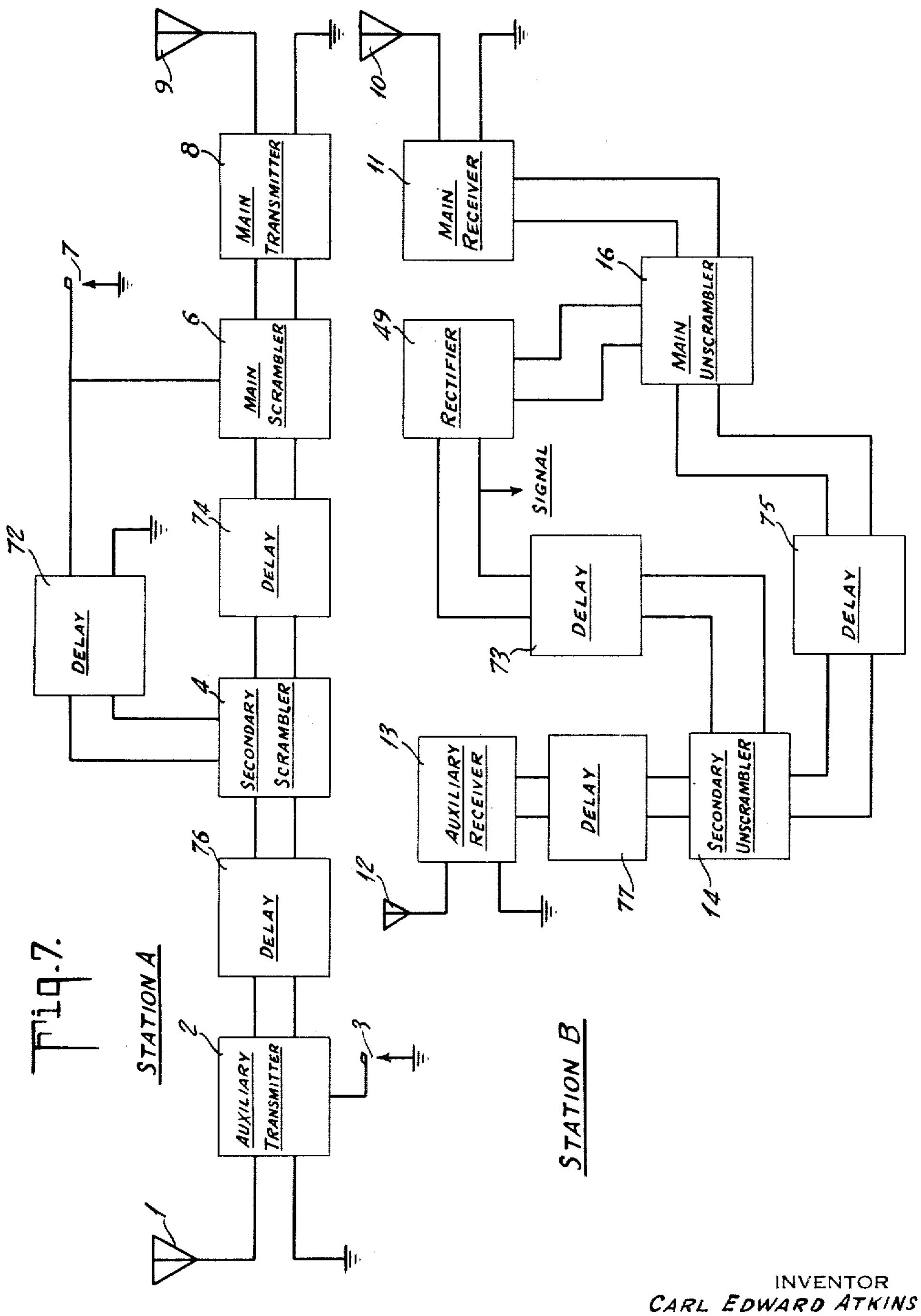

The system diagrammatically illustrated in Fig. 7 differs from that of Figs. 2 to 4 in that a delayed replica of the signal intelligence is utilized at each station to perform the function of commutator devices 5 and 15 of Fig. 2. At station A the equipment includes, as in Fig. 2, the transmitting antennae 1 and 9 for radiation of energy capriciously scrambled by key 3 and of the signal mixture respectively, the auxiliary and main transmitters 2 and 8 respectively associated with antennae 1 and 9, the key 7 for introduction of the signal intelligence and the "gate" or main scrambler 6 activated by the key 7 and by energy passed by a "gate" or secondary scrambler 4. Similarly, as in Fig. 2 station B includes the main receiver 11 for demodulation of energy received by antenna 10, auxiliary receiver 13 for demodulation of the capriciously varying energy received by antenna 12 and secondary unscrambler or "gate" 14 and main unscrambler or "gate" 16. In order to utilize a delayed replica of the signal intelligence for secondary scrambling in "gate" 4, a delay means 72 is provided between the key 7 and "gate" 4 at station A. Similarly a delay means 73 is provided between rectifier 49 and "gate" 14 at station B. An additional delay means positioned between "gates" 4 and 6 is provided at station A and a delay means 75 is provided at station B between "gates" 14 and 16. A delay means 76 is provided at station A between transmitter 2 and "gate" 4 and a delay means 77 is provided at station B between auxiliary receiver 13 and "gate" 14.

The various above mentioned delay means of Fig. 7 are preferably magnetic tape mechanisms of the type wherein an endless conducting loop, for example a wire, has telegraphic or other symbols magnetically impressed upon it at one point for pick-up at another point and in which the symbols are removed during the return trip by passage of the wire through a strong magnetic field. Such known tape mechanisms have the advantage over ordinary delay circuits in that messages or symbols may be stored thereon indefinitely. For this reason such mechanisms are preferably employed in the system of Fig. 7 as they insure that when communication is initiated scrambling information remaining on the mechanism from a previous period of communication will be immediately available.

The time delay in mechanism 72 of station A exceeds that in mechanism 73 at station B by an amount equal to the time of transit from one station to the other. The time delay of mechanism 75 of station B exceeds that of mechanism 74 of station A by the transit time, and that of mechanism 76 at station A exceeds that of mechanism 77 of station B by the same amount.

When communication is to be established at a predetermined time, the tape mechanisms of all stations are started in operation, key 3 is capriciously operated and the signal is introduced by key 7. "Gate" 6 at station A is then activated by pulses picked up from tape mechanism 74 which had remained thereon from previous operation, and by the signal from key 7. At station B the signal mixture from antenna 9 is picked up by antenna 10, demodulated in receiver 11 and delivered to "gate" 16 for activation thereof conjointly with activation by pulses picked up from mechanism 75. As will become apparent as the description proceeds, the pulses stored by mechanisms 74 and 75 are identical and hence the output from "gate" 16, upon rectification in rectifier 49, yields the useful signal. Meanwhile, "gate" 4 at station A is delivering additional scrambling information to mechanism 74 due to activation by the outputs from mechanisms 72 and 76, the former being a replica of the signal introduced by key 7 during preceding operation of the system, and the latter being a replica of previous operation of key 3. Similarly, "gate" 14 at station B is delivering identical additional unscrambling information to mechanism 75 as mechanism 73 has stored the previous signal and mechanism 77 has stored a replica of the operation of key 3. During continuing operation pulses originated by operation of key 3 arrive simultaneously at the portals of "gates" 4 and 14 and are scrambled at these "gates" by the delayed replica of the signal intelligence delivered by mechanisms 72 and 73 to yield the continuing scrambling information to mechanisms 74 and 75 for use in "gates" 6 and 16.

Thus the system of Fig. 7 differs from that of Figs. 2 to 4 primarily in that a delayed replica of the signal intelligence is used instead of the commutator devices for secondary scrambling and unscrambling of the capriciously varying energy.

The invention has now been described in connection with several embodiments thereof. In each embodiment of the invention two mixtures, only one of which includes components of the signal intelligence, are received at any number of receiving stations.

So far as the operation of the secret communication system of the invention is concerned, it is immaterial whether the source of the capriciously varying energy, that is, the mixture which does not include components of the signal intelligence, is located at the transmitting station or at a receiving station or at some other point so long as it is available alike at all of the stations.

In each embodiment detection of the signal requires the use of both mixtures and of scrambling information known only to the communicating stations. Thus an unauthorized intercepter of the transmitted mixtures can not, from either mixture alone or from both together, determine the communicated intelligence. The scrambling information known only to the communicating stations may be formal scrambling introduced by commutator devices or the like, such as indicated in Figs. 2 to 5 inclusive, or a prearranged and continued variation of the frequency of an oscillator as indicated in Fig. 6, or a delayed replica of the signal intelligence as disclosed in Fig. 7. Various alternative arrangements within the scope of the invention will occur to those skilled in the art. Preferably, the scrambling and unscrambling means at each of the stations, particularly when the signals to be communicated are telegraphic symbols, are electronic "gates" such as shown in Figs. 3 and 4 but other scrambling means could be employed if desired.

I claim:

1. The method of secret signaling from one station to a plurality of other stations which comprises varying energy capriciously, transmitting such capriciously varying energy to all of the stations, scrambling such received energy at each station in an identical manner, scrambling signal intelligence at the one station with the scrambled capriciously varying energy to form a signal mixture, transmitting the signal mixture to each of the other stations and finally at each of the other stations unscrambling the received signal mixture with the scrambled capriciously varying energy.

2. A secret communication system for transmitting secret intelligence from one station to a plurality of other stations which comprises a source of capriciously varying energy, means rendering such energy available at each of said stations, like means at each of said stations for scrambling such energy, means at the one station for scrambling signal intelligence with such scrambled energy and for transmitting the resulting signal mixture to the other stations, means at each of the other stations for receiving the signal mixture, and means at each of the other stations for utilizing the scrambled capriciously varying energy for unscrambling the received signal mixture.

3. A secret system for signaling from a transmitting station to a receiving station which comprises a source of capriciously varying energy at the transmitting station, means for transmitting such varying energy to the receiving station for reception thereat, means at each station for identically scrambling such capriciously varying energy, means at the transmitting station for scrambling a signal with such scrambled capriciously varied energy, means for transmitting the scrambled signal from the transmitting station to the receiving station, and means at the receiving station controlled jointly by said scrambled capriciously varying energy and by the received scrambled signal for yielding the signal.

4. The system according to claim 3 wherein the transmitting station includes two generators of energy of different frequency, means for capriciously actuating one of said generators, said last mentioned means and the generator actuated thereby comprising said source of capriciously varying energy, said other generator being actuated by said signal scrambling means and wherein said means for transmitting the varying energy and the scrambled signal comprise a single transmitter jointly energized by said generators and wherein said receiving station includes a single receiver and band-pass filters associated therewith for selectively applying the energy corresponding to the first mentioned generator to said treating means and the energy corresponding to the other generator to the signal yielding means.

5. A system for secret transmission of signal intelligence from one station to another which comprises a source of capriciously varying energy, means at the transmitting station for creating a delayed replica of signal intelligence, means at the transmitting station for scrambling such delayed replica with energy from said source, means for scrambling signal intelligence with the scrambled delayed replica and for transmitting the resulting signal mixture to the other station, means at the other station for receiving the signal mixture, and means at the other station for unscrambling the signal mixture.

6. The system according to claim 5 wherein said last mentioned means include means for creating a delayed replica of signal intelligence previously received, means for scrambling such replica with energy from said source and means controlled by the received signal mixture and by the scrambled replica.

7. The method of secretly transmitting intelligence from a transmitting station to a receiving station which comprises creating at each station a delayed replica of a signal previously transmitted, synchronously scrambling such replica at each station with capriciously varying energy alike available at each station, utilizing such scrambled replica at the transmitting station to scramble the signal to be transmitted, transmitting the scrambled signal to the receiving station and utilizing at the receiving station the corresponding scrambled replica to determine the signal intelligence from the received scrambled signal.

8. A secret communication system for transmitting signal intelligence from one station to a plurality of other stations which comprises a source of capriciously varying energy, an electronic switch at the transmitting station having two input terminals and one output terminal and adapted to pass energy only when energy is applied to one or the other of the input terminals, a device for applying energy varying in a predetermined manner to one of said input terminals, means for applying energy from said source to the other input terminal, a second electronic switch at the transmitting station similar to the first mentioned electronic switch and having one input terminal connected to the output of the first mentioned electronic switch, means for applying signal energy to the second input terminal of said last mentioned electronic switch, and means connected to the output terminal of said last mentioned electronic switch for transmitting the energy passed thereby to each of the other stations, means at each of the other stations for receiving the energy transmitted from the transmitting station and for receiving energy from said source, and means at each of the other stations including a pair of electronic switches each similar to the electronic switches at the transmitting station, and a device for applying energy to an input terminal of one of the electronic switches varying in the same predetermined manner for determining the signal introduced at the transmitting station from the energy transmitted from the transmitting station, the energy from said source and the energy varying in the predetermined manner.

9. The system according to claim 8 wherein one of the electronic switches at a receiving station is activated by the energy from said source and by the energy varying in a predetermined manner, and the other electronic switch at that station is activated by the output from the first elecronic switch and by the energy received from the transmitting station whereby the output of said last mentioned electronic switch yields the signal.

10. The system according to claim 8 wherein one of the electronic switches at a receiving station is activated by the energy varying in a predetermined manner and by the energy received from the transmitting station and the other electronic switch at that station is activated by the output from the first electronic switch and by the energy from said source whereby the output of said last mentioned electronic switch yields the signal.

11. The system according to claim 8 wherein each of the devices at the different stations for applying energy varying in a predetermined manner to an input terminal of an electronic switch comprises means for creating a delayed replica of the signal intelligence and wherein each of the stations include delay means for insuring operation of the electronic switches in timed relation.

CARL EDWARD ATKINS.

REFERENCES CITED

The following references are of record in the file of this patent:

UNITED STATES PATENTS

| Number | Name | Date |
|---|---|---|
| 1,573,983 | Mathes | Feb. 23, 1926 |
| 1,665,328 | Schmitt | Apr. 10, 1928 |
| 1,708,518 | Peterson | Apr. 9, 1929 |
| 2,175,270 | Koch | Oct. 10, 1939 |
| 2,199,634 | Koch | May 7, 1940 |
| 2,272,999 | Curtis | Feb. 10, 1942 |
| 2,294,129 | Purington | Aug. 25, 1942 |

FOREIGN PATENTS

| Number | Country | Date |
|---|---|---|
| 288,714 | Great Britain | Apr. 12, 1928 |